(12) United States Patent
Ebrahimi Afrouzi

(10) Patent No.: US 12,138,778 B1
(45) Date of Patent: Nov. 12, 2024

(54) CONTROL SYSTEM FOR ROBOTIC DEVICES

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 17/473,702

(22) Filed: Sep. 13, 2021

Related U.S. Application Data

(63) Continuation of application No. 16/130,880, filed on Sep. 13, 2018, now abandoned.

(60) Provisional application No. 62/594,127, filed on Dec. 4, 2017, provisional application No. 62/558,272, filed on Sep. 13, 2017.

(51) Int. Cl.
*B25J 13/00* (2006.01)
*B25J 9/16* (2006.01)
*G05B 19/418* (2006.01)

(52) U.S. Cl.
CPC .......... *B25J 13/006* (2013.01); *B25J 9/1679* (2013.01); *G05B 19/4186* (2013.01); *G05B 19/41865* (2013.01)

(58) Field of Classification Search
CPC ..... B25J 9/00; B25J 9/0003; B25J 9/16; B25J 9/1602; B25J 9/1656; B25J 9/1658; B25J 9/1661; B25J 9/1664; B25J 9/1666; B25J 9/1674; B25J 9/1676; B25J 9/1679; B25J 9/1694; B25J 9/1697; B25J 11/00; B25J 11/003; B25J 11/0045; B25J 11/008; B25J 11/0085; B25J 13/00; B25J 13/006; B25J 13/08; B25J 13/086; B25J 13/088; B25J 13/089; G05B 19/00; G05B 19/25; G05B 19/253; G05B 19/31; G05B 19/313; G05B 19/37; G05B 19/373; G05B 19/39; G05B 19/40; G05B 19/41; G05B 19/418; G05B 19/4185; G05B 19/4186; G05B 19/41865
USPC ........................................................ 700/245
See application file for complete search history.

(56) References Cited

U.S. PATENT DOCUMENTS

| | | |
|---|---|---|
| 5,355,064 A | 10/1994 | Yoshino |
| 5,400,244 A | 3/1995 | Watanabe |
| 5,652,489 A | 7/1997 | Kawakami |
| 5,959,423 A | 9/1999 | Nakanishi |
| 6,804,580 B1 | 10/2004 | Stoddard |
| 8,774,966 B2 * | 7/2014 | Ziegler ................. A47L 7/0038 700/245 |
| 9,796,091 B1 * | 10/2017 | Soo .................... G06Q 10/1095 |
| 10,124,488 B2 * | 11/2018 | Lee ....................... G05D 1/0214 |
| 2013/0204430 A1 * | 8/2013 | Davey ..................... G06F 30/13 700/216 |

(Continued)

FOREIGN PATENT DOCUMENTS

KR 101408075 B1 * 6/2014

*Primary Examiner* — Khoi H Tran
*Assistant Examiner* — Sarah A Tran

(57) ABSTRACT

A control system that coordinates and manages the execution of tasks by one or more robotic devices within an environment. The control system transmits and receives information to and from one or more robotic devices using a wireless communication channel. The one or more robotic devices may execute one or more actions based on the information received and may transmit information to the control system using a wireless communication channel.

16 Claims, 4 Drawing Sheets

(56) References Cited

U.S. PATENT DOCUMENTS

| | | | | |
|---|---|---|---|---|
| 2015/0190925 A1* | 7/2015 | Hoffman | ................. | B25J 9/161 |
| | | | | 901/47 |
| 2016/0291595 A1* | 10/2016 | Halloran | ............. | A47L 11/4072 |
| 2017/0050321 A1* | 2/2017 | Look | ................ | G06Q 10/06398 |
| 2017/0195166 A1* | 7/2017 | Keerthi | ............ | G08G 1/096811 |
| 2017/0229025 A1* | 8/2017 | Klinger | ................ | G05B 13/024 |
| 2017/0355076 A1* | 12/2017 | Gordon-Carroll | ..... | G06Q 10/08 |
| 2017/0357256 A1* | 12/2017 | Mizutani | .............. | G05D 1/0297 |
| 2018/0311815 A1* | 11/2018 | Shaw | ..................... | B25J 9/1671 |
| 2018/0330325 A1* | 11/2018 | Sibley | ................... | G07B 17/00 |
| 2018/0330426 A1* | 11/2018 | Kumar | ............... | G06Q 30/0635 |
| 2018/0349834 A1* | 12/2018 | Heinla | ................ | G06Q 10/083 |
| 2020/0061839 A1* | 2/2020 | Deyle | ................. | G06Q 10/087 |

* cited by examiner

CONTROL SYSTEM FOR ROBOTIC DEVICES

CROSS-REFERENCE TO RELATED APPLICATIONS

This application is a Continuation of U.S. Non-Provisional patent application Ser. No. 16/130,880, filed Sep. 13, 2018, which claims the benefit of Provisional Patent Application Nos. 62/558,272, filed Sep. 13, 2017, and 62/594,127, filed Dec. 4, 2017, each of which is hereby incorporated by reference. In this patent, certain U.S. patents, U.S. patent applications, or other materials (e.g.) articles) have been incorporated by reference. Specifically, U.S. Application Nos. 62/616,669 is hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present invention relates to semi-autonomous and/or autonomous devices in general, and more particularly to control systems for one or more semi-autonomous and/or autonomous devices.

BACKGROUND

Autonomous robotic devices are becoming increasingly common in consumer homes and commercial spaces. In several instances, autonomous robotic devices are desirable for the convenience they provide to a user. For example, autonomous mobile robotic devices may be used for cleaning homes, waste management, industrial tasks and the like. As the technology progresses, autonomous robotic devices may be implemented on a larger scale. For example, a network of robotic devices may be implemented within an environment to collaboratively execute tasks. In such instances, a control system for the network of robotic devices may be beneficial.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects include a method for managing robotic devices using a control system including: receiving, by the control system, a request for delivery of an item to a delivery location from an application of a communication device; determining, by the control system, a first robotic device among a group of robotic devices to transmit an instruction for the delivery of the item to the delivery location; receiving, by the first robotic device, the instruction; and executing, by the first robotic device, the instruction comprising a pickup of the item from a pickup location and the delivery of the item to the delivery location.

Some aspects provide a management system for managing robotic devices, including: an application of a communication device configured to receive at least one input designating a request for delivery of an item to a delivery location; a control system configured to: receive the request for delivery of the item to the delivery location from the application of the communication device; and determine a first robotic device among a group of robotic devices to transmit an instruction for the delivery of the item to the delivery location; and the group of robotic devices, each configured to: receive the instruction; and execute the instruction comprising a pickup of the item from a pickup location and the delivery of the item to the delivery location.

BRIEF DESCRIPTION OF THE DRAWINGS

Non-limiting and non-exhaustive features of the present invention are described and depicted with reference to the following figures, wherein like reference numerals refer to like parts throughout the various figures.

DETAILED DESCRIPTION OF SOME EMBODIMENTS

Figure 1:
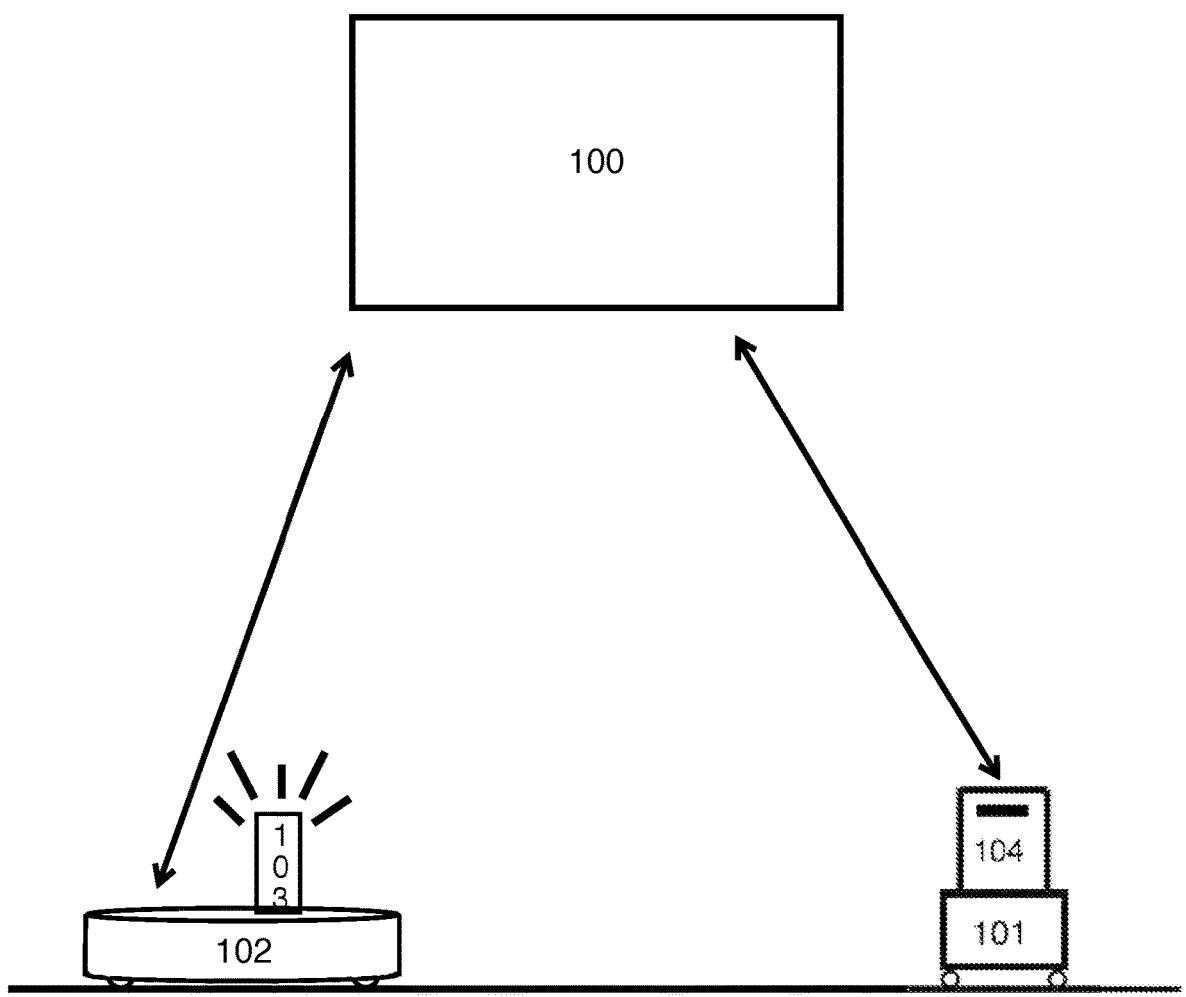
FIG. 1 illustrates an embodiment of a method for sending information to an autonomous device using cloud services and RF interface, in accordance with some embodiments.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

As understood herein, the term "autonomous robotic device" may be defined generally to include one or more mobile and/or static autonomous robotic devices with communication and/or processing elements. For example, an autonomous mobile robotic device may include, but is not limited to, a casing or shell, a chassis including a set of wheels, a motor to drive the wheels, a receiver that acquires signals transmitted from, for example, a transmitting beacon, a transmitter that transmits signals, a processor and/or control system that processes and/or controls the motor and other autonomous robotic functions and/or operations, network or wireless communication, power management, etc., and one or more clock or synchronizing devices. The autonomous mobile robotic device may also include other elements such as a mapping module for mapping the environment, a localization module for localizing the robotic device within the environment, a navigation module for navigating throughout the environment, a path planning module for planning routes within the environment, a scheduling module for scheduling tasks, a set of sensors for internal and/or external observations, an integrated graphical user interface, etc.

As understood herein, the term "user" or "users" may be defined generally to include any entity that may use or communicate with the mobile robotic device including, but not limited to, humans, other robotic devices, control systems, specialized computers, and the like.

Some embodiments introduced herein include a method for managing with one or more robotic devices using a control system by transmitting information using a wireless communication channel to the one or more robotic devices by the control system, receiving the information using a wireless communication channel by the one or more robotic devices, executing one or more actions by the one or more robotic devices based on the information received, transmitting information using a wireless communication channel to the control system by the one or more robotic devices, receiving the information using a wireless communication channel by the control system. In some embodiments, the information transmitted by the control system and/or the one or more robotic devices is collected and transmitted in real-time. In some embodiments, the control system and/or the one or more robotic devices may store the information received in a memory. In some embodiments, information stored in memory of the control system may be used to generate additional information, such as instructions for the one or more robotic device, make decisions, optimize processes, etc. In some embodiments, information stored in memory of one or more robotic devices may be used to generate additional information, such as instructions, make decisions, optimize processes, etc.

In some embodiments, the information transmitted from the control system to the one or more robotic devices may be instructions and/or commands and/or relevant information that may be used by the one or more robotic devices to, for example, make decisions and/or optimize individual processes. In some embodiments, the information transmitted from the one or more robotic device to the control system may be external observations of the environment, status updates, GPS coordinates, etc. that may be used to, for example, make decisions, modify commands/instructions/information sent to other robotic devices, optimize processes and optimize collaboration among the one or more robotic devices.

In embodiments, the control system may be, for example, a centralized server, a specialized computing device within a consumer home, an application (mobile or web for example) accessible from a communication device such as a mobile phone, tablet, laptop, etc. and the like. The centralized control system may communicate with robotic devices within an environment using a wireless communication channel such as Wi-Fi (or another RF-based wireless signal) or Bluetooth. In embodiments, the control system may be used to communication information to one or more robotic devices within an environment, wherein an environment may encompass a consumer home, a commercial establishment, a parking lot, one or more cities, and the like. In embodiments, the control system may be autonomous, semi-autonomous and/or may be manually operated. In embodiments, the control system communicates with one or more robotic devices within an environment to organize and improve the efficiency of the execution of one or more tasks by the one or more robotic devices within the environment. The one or more tasks may be, for example, the collection of refuse from consumer homes, distribution of items to commercial establishments, item pickup and delivery, playing music in the room within which the home owner is present, cleaning a home, transportation of items, and the like.

In embodiments, the control system may communicate with various robotic devices within an environment, some of which may be semi-autonomous or autonomous, static or mobile. Examples may include, but are not limited to, home assistants such as a Google Assistant or Amazon Alexa, an electronic speaker, a coffee maker, a television, a washing machine, a wireless router, a mobile robotic vacuum, a mobile robotic platform, a mobile robotic refuse container, a vehicle, etc. Robotic devices may include, but are not limited to, a set of wheels (if mobile for example), a power source, a chassis, a suspension system, a rechargeable battery, a control module, a processor and the like. In some embodiments, robotic devices may further include a mapping module for mapping the environment using mapping techniques such as SLAM, and mapping tools such as imaging devices, sonar devices, LIDAR and LADAR devices, structured light devices, stereo vision and the like. In some embodiments, the robotic device may further include a localization module. Cameras, LIDAR, LADAR, stereo imaging, signal detectors and receivers, gyroscope, optical encoder, optical flow sensor, TOF sensors, depth sensors and other devices may be used to capture information that the processor of the robotic device may use to, for example, build a map, localize itself within a map of the environment, and navigate within the environment. In some embodiments, the processor of the robotic device may use machine learning techniques to optimize processes. For example, the processor may learn the most optimal route for a robotic device travelling from a first point to a second point over time using various observations collected during operation. For example, observations such as number of collisions, travel time, number of times a device has stalled, obstacles expected to encounter, obstacles actually encountered and travel distance may be used in determining the most optimal path for travelling from a first point to a second point. In some embodiments, the robotic device may have a wireless module to wirelessly send and receive information, such as a Wi-Fi module (or another variation of RF) or a Bluetooth module. In some embodiments, the robotic device may include a scheduling module for, for example, setting a schedule for work tasks. This may include the day, time, frequency, duration of time for remaining at a particular location, and the like.

In some embodiments, a control system may communicate commands to one or more autonomous robotic devices using a wireless communication channel such as, Wi-Fi or Bluetooth. FIG. 1 illustrates an embodiment of the invention wherein robotic platforms 101 and 102 transport items such as mobile router 103 and grocery bag 104 in an environment while robotic platforms 101 and 102 are wirelessly connected to a control system 100. Robotic platforms 101 and 102 may transmit or receive information from control system 100 using the wireless communication channel. For instance, robotic platforms 101 and 102 may transmit their status including information such as battery level, GPS coordinates, availability, etc., to control system 100. Based on the received information, control system 100 may transmit one or more commands to robotic platforms 101 and 102. For example, if both robotic platforms 101 and 102 are available for grocery pickup and delivery, and both have similar battery life but robotic platform 101 is closer to the grocery store, control system 100 may command robotic platform 101 to pick up groceries at the grocery store and deliver them to a particular location. In embodiments, the control system may transmit various commands to one or more robotic devices. Commands may include, but are not limited to, navigating to a particular location, recharging the battery, travelling at a specific speed, avoiding a particular area, avoiding particular surface types, conducting particular tasks at particular times, avoiding operation at particular times, playing music, carrying an item, navigating to a docking station, stopping a work function, conducting an internal diagnostic check, etc. In embodiments, control system 100 may transmit scheduling information to one or more robotic devices that may include dates, times, and locations associated with particular tasks assigned to the one or more robotic devices. For example, a control system may provide that robotic vacuum cleaners in a home are to clean at specific times of the day when the homeowner is not home. For example, a control system may order that the upstairs vacuum cleaner operate every other day at 11 am, and that a downstairs vacuum cleaner operate everyday at 1 μm. In some embodiments, a control system may be able to coordinate and manage the functions of different types of robotic devices. For example, a control system may be responsible for controlling robotic vacuum cleaners in a home, while also controlling the actions of a robotic platform. For example, a control system may schedule robotic vacuum cleaners to clean a home everyday at 1 pm, while also coordinating a robotic platform carrying a mobile router to follow a homeowner around a home one the homeowner arrives at the home.

In embodiments, the information transmitted and received between the control system and the one or more robotic devices may include several different types of information, such as scheduling information, mapping information, navigation information, task information, status information, internal or external observations, or any other type of information that may be useful to the control system and/or the one or more robotic devices.

In another example, a control system may coordinate multiple robotic chassis within a city that are used to transport passengers and/or objects wherein objects may sit directly on the chassis or pods may attach to the chassis within which passengers and/or objects may ride. Passengers may request transportation from one location to another, businesses may request delivery of particular items to or from a particular location, consumers may request pickup, delivery and/or transportation of items, and the like using, for example, an application of a communication device. The control system may receive a request and based on the information the control system has on the different robotic chassis to which it is connected may transmit one or more commands to a particular robotic chassis. The control system may have information such as the carrying capacity, GPS coordinates, battery level, status, and availability of the robotic devices to which is has a connection to. The control system may also consider environmental factors such as traffic, construction, and the like as well as other pending requests or tasks in choosing which robotic chassis to send the one or more command to.

In another example, a control system may coordinate and manage refuse collection from multiple mobile robotic refuse containers. The control system may be a specialized computing system of a refuse collection vehicle or in other instances may be a specialized computing system housed elsewhere. For example, the control system may be located in a corporate building or in a centralized location where all collected refuse is dumped. When the refuse collection vehicle is within a predetermined distance from the one or more mobile robotic refuse containers a receiver of the one or more robotic refuse containers may receive a command transmitted from the control system to navigate to their respective refuse collection location or to another specified location. In some embodiments, the information transmitted by the control system may indicate a specific date and time and location to navigate to for refuse collection. Once the refuse has been collected by the refuse collection vehicle, the control system may transmit instruction to the one or more robotic refuse containers to navigate back to their respective refuse container storage location. The control system may be notified by the one or more robotic refuse containers when their refuse has been collected or the command to return to the refuse storage location may be sent when the refuse collection vehicle reaches outside a predetermined range of the one or more robotic refuse container. The information may be transmitted between the control system and robotic refuse containers using Wi-Fi, Bluetooth, or other types of wireless connections. The control system may monitor the location of robotic refuse containers in real time using GPS technology.

In one example, a control system may coordinate robotic servers within a restaurant environment. For example, a user may place an online order for pickup at a fast food restaurant using an application of a communication device. The control system may monitor the location of the user in real time using GPS technology and when the user arrives within a predetermined distance or time from the restaurant, the control system may instruct a robotic server to pick up the food order from the kitchen and navigate to the user's vehicle or a predetermined delivery location. The control system may consider the availability and the location within the environment of different robotic servers prior to deciding which robotic server to transmit the instruction to. The control system may consider the size of the user's order and command multiple robotic servers to deliver the user's food order. In some embodiments a user may place an order for an item(s) from a retail establishment. The control system may monitor the location of the user in real time using GPS technology and when the user arrives within a predetermined distance or time from the retail establishment, the control system may instruct a robot delivery device to obtain the item(s) ordered and navigate to the user's vehicle, or to a predetermined delivery location. The control system may consider the available and location within the environment of different robotic delivery devices prior to deciding which robotic delivery device to transmit the instruction to.

In another example, a control system may coordinate cleaning of a consumer home by one or more robotic vacuums. The control system may transmit information such as, area to clean, date and time to clean, surface type, cleaning tool, to the one or more robotic devices based on information received from the one or more robotic vacuums such as location within the home, cleaning capabilities, battery level, etc. For example, the control system may command the robotic vacuum closest to the kitchen and with mopping capabilities to clean the kitchen. If the robotic vacuum has low battery, the control system may command the next robotic vacuum closest to the kitchen and with mopping capabilities to clean the kitchen while commanding the robotic vacuum with low battery to navigate to a charging station. Other robotic vacuums within the consumer home may be commanded to clean areas closest to their current location.

In an example, a consumer home or commercial establishment may have a control system device that may communicate information to one or more robotic devices within the environment. The control system may be autonomous and use machine learning techniques to learn needs of the environment and/or preferences of those within the environment or a user may manually use the control system to transmit information to robotic devices within the environment by, for example, a mobile application of a communication device. For example, a control system may autonomously command a robotic platform to transport an item, such as a home assistant device, around the environment such that it is within a particular distance from a user, a robotic coffee maker to start a pot of coffee, a music player to play jazz music in the evening, etc. based on observations of actions of the user over time or based on preferences set by the user.

In embodiments, the control system may transmit information simultaneously to multiple robotic devices or may transmit information individually to a single robotic device. For example, in instances wherein a group of robotic devices collaborate to execute one or more tasks, the control system may simultaneously transmit information to all robotic devices in the group such that they may more efficiently execute a task.

In embodiments, the control system may transmit instructions to execute particular driving settings to one or more mobile robotic devices such as, traveling speed and navigation route. In some embodiments, the mobile robotic devices may notify the control system if it is malfunctioning, damaged, stalled, stuck, or the like. In instances wherein mobile robotic devices are in the process of executing a task, the control system may command another mobile robotic device to complete the task. In some embodiments, the control system may alert the police and/or paramedics if a mobile robotic device is involved in an accident. In some embodiments, the control system may alert a user or an operator if a robotic device becomes stuck, stalled, damaged or inoperable. In some embodiments, the control system the control system may command a robotic device to maneuver away from an obstacle if an unanticipated obstacle is encountered.

Figure 2:
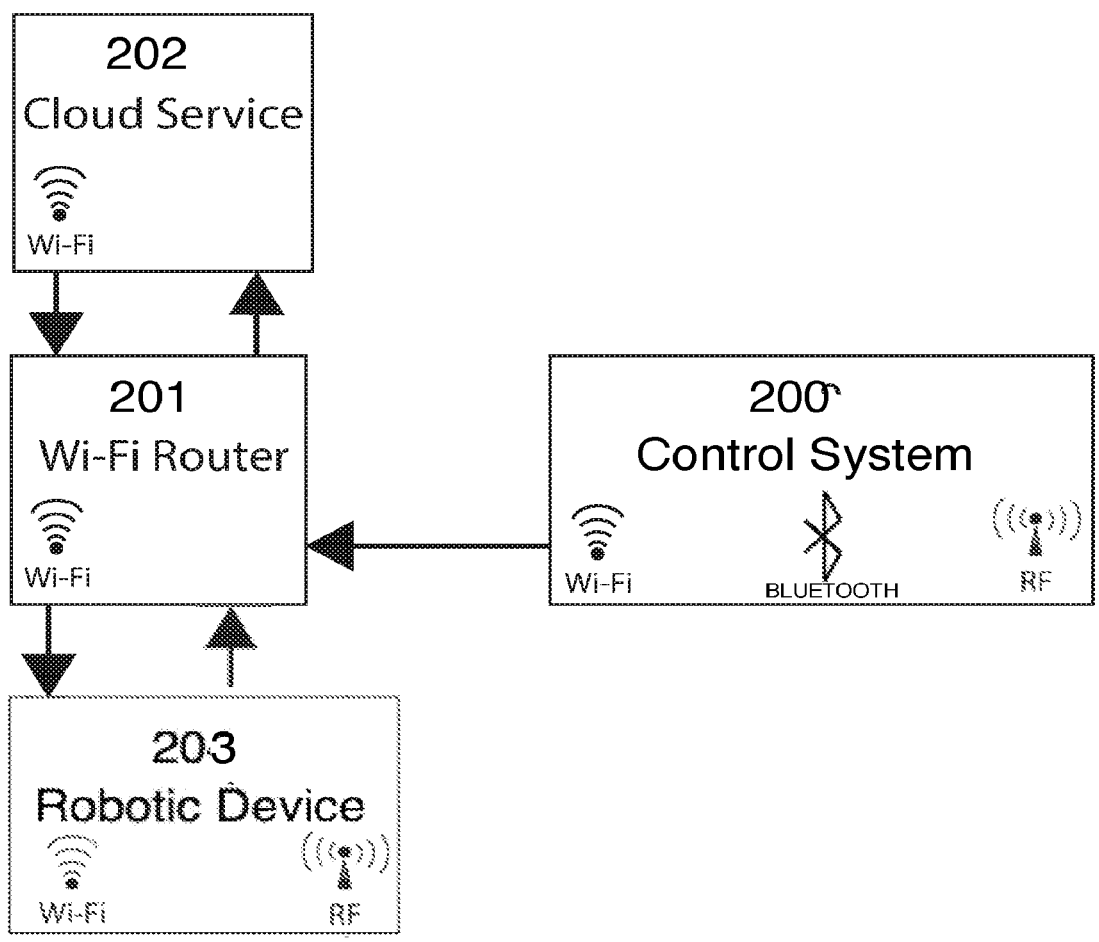
FIG. 2 illustrates a flowchart depicting an embodiment of a method for sending information to an autonomous robotic device using cloud services and RF interface, in accordance with some embodiments.
Figure 3:
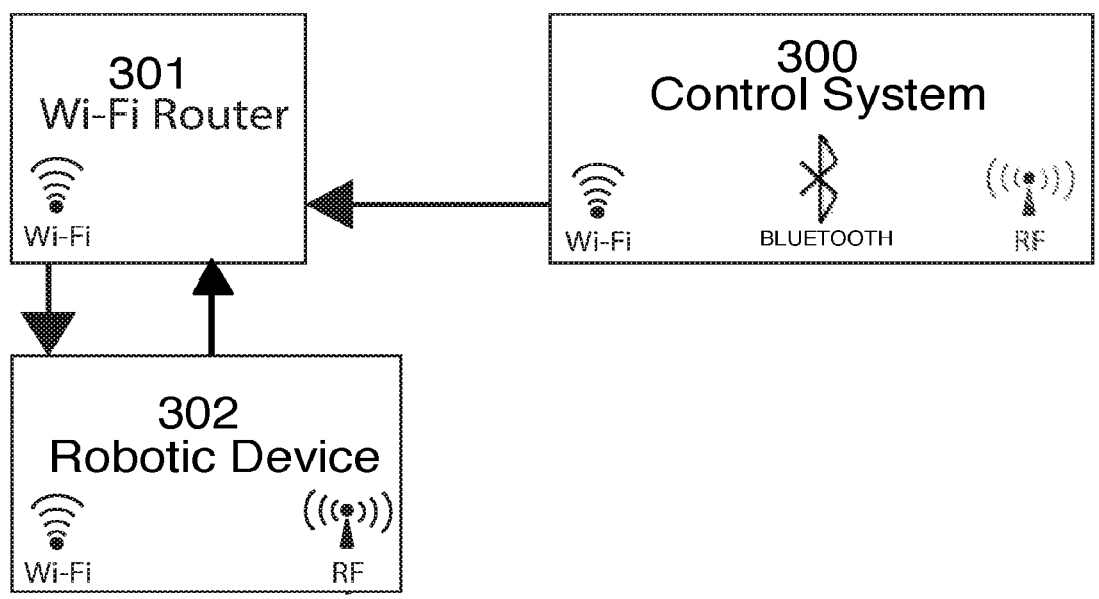
FIG. 3 illustrates a flowchart depicting an embodiment of a method for sending information to an autonomous robotic device using local connection and RF interface, in accordance with some embodiments.
Figure 4:
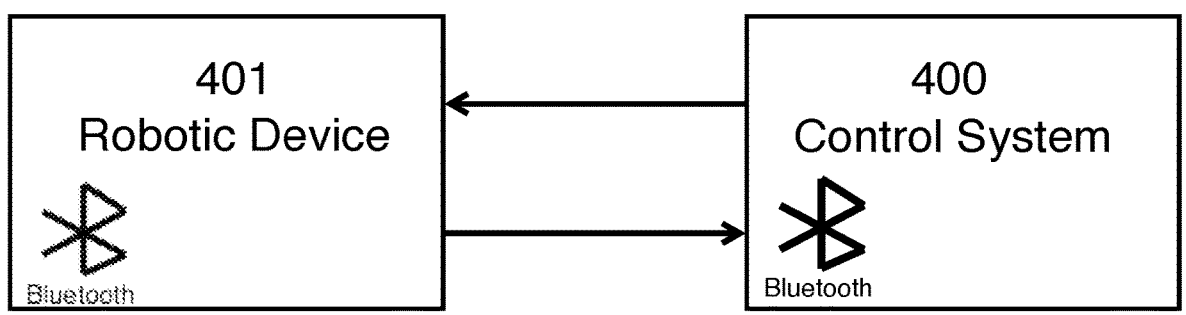
FIG. 4 illustrates a flowchart depicting an embodiment of a method for sending information to an autonomous robotic device using Bluetooth connection, in accordance with some embodiments.

FIG. 2 illustrates a flowchart depicting an embodiment of a control system sending information to a robotic device using a cloud service. Control system 200 may transmit information to Wi-Fi router 201 using a wireless communication channel. Wi-Fi router 201 may transmit the information to cloud service 202 using a wireless communication channel. Cloud service 202 may transmit the information to Wi-Fi router 201 which then relays the information to robotic device 203. The reverse may be executed such that the robotic device may transmit information to the cloud and the control system retrieve the information from the cloud. In some embodiments, the information may include a unique tag such that the robotic device may only retrieve information pertaining to itself and the control system may be aware of which robotic device the information retrieved pertains to. Alternatively, information may be transmitted and received locally. FIG. 3 illustrates a flow chart depicting an embodiment of a method for sending information to a robotic device locally. A control system 300 may transmit information to Wi-Fi router 301, which may then transmit the information to robotic device 302 using Wi-Fi. The reverse may be executed wherein robotic device 302 transmits information to Wi-Fi router 301 which then transmits the information to control system 300. FIG. 4 illustrates a flowchart depicting an embodiment of a method for sending and receiving information to a robotic device locally is illustrated. Control system 400 may transmit information directly to robotic device 401 utilizing, for example, a Bluetooth connection. The reverse may be executed wherein robotic device 401 transmits information directly to control system 400.

In some embodiments, a control system responsible for managing item pick up, transport, distribution and/or delivery may transmit a signal to a receiver of the robotic device to notify the processor of the robotic device of the day and time of item pick up, transport, distribution and/or delivery of an item. In some embodiments, a signal received by the receiver may indicate immediate transport of a particular item to a specific location. The signal may be a Wi-Fi signal, Bluetooth signal, or other type of wireless signal. In some embodiments, a control system, may transmit information to one or more robotic devices to notify the one or more robotic devices that it is time for an item to be picked up, transported, distributed and/or delivered at which point each mobile robotic device within the area may execute their respective task. In some embodiments, the control system may transmit information to notify the one or more robotic devices that they may navigate to their respective storage location or to another location after, for example, task completion. In some embodiments, a control system responsible for the work tasks of the one or more robotic devices may monitor the location of the one or more robotic devices or users interacting with the one or more robotic devices in real-time using sensors such as cameras, microphone module, etc. For example, the control system may send an instruction to a robotic device of a user to execute a particular task after observing the user entering their home. In some embodiments, the control system may provide commands or instructions to the one or more robotic devices based on prior observations collected by sensors within the environments and/or on the robotic device. For example, based on a prior history of a user most often playing music using their movable music device after work, the control system may command a robotic device of the user to pick up and transport the moveable music player such that it constantly remains close to the user using wireless Wi-Fi, Bluetooth, or the like upon observing the user entering their home. In some embodiments, the user of the robotic device may instruct the robotic device to do the same using a communication device paired with the robotic device, an interface of the robotic device, or another method for communicating with the robotic device. In another example, a control system may send a command using Wi-Fi, Bluetooth, or the like, to one or more robotic devices to transport a refuse waste bin to a collection location upon observing a refuse collection vehicle within a predetermined range of the robotic device. The control system may also send a command to the one or more robotic devices to return to their storage location after observing that refuse collection has been completed.

In embodiments, preferences may be set within the control system. For example, in some embodiments, preferences or instructions corresponding to a particular user may be set within the control system. In embodiments, the control system may instruct a robotic device to execute a particular task when a particular user becomes present within an environment. For example, a user may select that the control system ensure that a user have a mobile robotic wireless router device follow a user around the home when the user enters the home. When the control system detects that the user has entered the home, the control system may send a command to the mobile robotic router to follow the user around the home. In some embodiments, the control system may detect a user using sensors, cameras, or the like, or may be made aware that a user has entered an area of the environment by a signal sent from a communication device paired with the control system, the robotic device, or other control system. A communication device may comprise a mobile device, tablet, laptop, remote control, etc. In another example, preferred paths of robotic grocery carts may be set within a control system coordinating the delivery of groceries by robotic grocery carts such that areas of high traffic or accidents may be avoided.

In embodiments, the control system may store all or a portion of the information obtained from all or a portion of the robotic devices to which it is connected to. In embodiments, the historical information may be used to improve decisions made by the control system and processes and/or execution of tasks coordinated by the control system. For example, a control system coordinating delivery of groceries by multiple robotic grocery carts may learn using machine learning techniques the type of issues that commonly occur over time such that they may be avoided in the future and the process of delivering groceries to customers may be optimized. Issues may include, but are not limited to, collisions, delayed deliveries, incomplete deliveries, and the like. For example, the control system may choose a particular route for a robotic grocery cart delivering groceries to a particular location that avoids areas in which issues were previously noted due to, for example, high traffic areas and/or collision.

In embodiments, information gathered by components of robotic devise may be transmitted to the control system in real time. In embodiments, all or a portion of the information gathered by robotic devices may be stored in a centralized memory and may be accessed by the control system and/or robotic devices.

In embodiments, the control system may obtain multiple maps of the working environment generated during multiple working sessions of multiple robotic devices. The maps may be combined with previously generated maps to keep the map of the working environment up to date or to improve the accuracy of the map of the environment. In some embodiments, a predetermined map of the working environment may be used by the control system and/or robotic devices to which the control system is connected to. In some embodiments, one or more robotic devices may generate one or more maps of the working environment during operation in the working environment and may transmit the map to the control system. In embodiments, the control system may update the map of the working environment with the observations collected and transmitted by the one or more robotic devices during work sessions. Continuous updates to the map of the working environment may help improve efficiency of decisions, processes and execution of tasks.

In embodiments, a graphical user interface may be used to transmit information to a control system. Information may include, but is not limited to, request for grocery delivery, request for transportation, request for item pickup and/or delivery, user preferences for a home (e.g., temperature, lighting, etc.), request for information regarding the environment and/or robotic devices, etc. In embodiments, the graphical user interface may be accessed by an application of a communication device capable of transmitting and receiving information to and from the control system using a method such as that described in FIG. 2, FIG. 3 or FIG. 4. Communication devices may include, but are not limited to, mobile phone, laptop, tablet, desktop computer, and the like. In some embodiments, a user may communicate with a control system in real time. For example, a user requiring transportation may communicate a request for transportation to a particular location to a control system that coordinates transportation of passengers within a city by robotic passenger pods using, for example, a graphical user interface of an application of a communications device. The control system may then transmit one or more instructions to a robotic passenger pod such that the request of the user may be fulfilled. The control system may determine which robotic passenger pod to transmit the instructions to depending on, for example, the location, availability, battery level, etc. of the robotic passenger pods and the start and ending location requested by the user.

In some embodiments, a control system may coordinate and/or organize and/or manage a continuous service and supply of robotic devices. For example, a control system may manage a collection of robotic refuse containers located in a public location, such as an airport. The control system may ensure that all robotic refuse containers available to the public are capable of receiving refuse. Robotic refuse containers may communicate information relating to the level of refuse within their respective container and/or their battery level to the control system. When a first robotic refuse container becomes full or requires charging the control system may transmit instructions to an unused second robotic refuse container to replace the first robotic refuse container and instructions to the first robotic refuse container to recharge its batteries. The control system may choose which robotic refuse container to transmit the instructions to based on, for example, the amount of refuse within the container, the location of the first and second robotic refuse container, the battery level, time to reach the location of the first robotic refuse container etc. The information sent to the second robotic refuse container may include the location of the first robotic refuse container, the route to navigate to the location, etc. and the information sent to the first robotic refuse container may include the closest location to recharge, the closest refuse collection location, etc. An example of such a continuous robotic refuse container service and supply coordinated by a control system may be found in U.S. Patent App. No. 62/616,669, the entirety of which is hereby incorporated by reference.

In embodiments, each robotic device may optimize decisions, processes, execution of tasks individually based on, for example, internal and/or external observations, information received from the control system and/or other robotic devices, historical information, etc. In embodiments machine learning techniques may be used. In some embodiments, the control system may optimize decisions, processes, execution of tasks for individual robotic devices to which it is connected to. In some embodiments, the control system may optimize decisions, processes, execution of tasks for the collection of robotic devices it is connected to. This may occur in instances wherein robotic devices collaborate to execute one or more tasks.

The foregoing descriptions of specific embodiments of the invention have been presented for purposes of illustration and description. They are not intended to be exhaustive or to limit the invention to the precise forms disclosed.

The invention claimed is:

1. A method for managing robotic devices using a control system comprising:
   receiving, by the control system, a request for delivery of an item to a delivery location from an application of a communication device;
   determining, by the control system, which robotic device among the group of robotic devices to transmit the instruction to based on a status of each robotic device, an availability of each robotic device, a battery level of each robotic device, GPS coordinates of each robotic device, a carrying capacity of each robotic device, environmental factors, traffic, the delivery location, and pending requests received by the control system, wherein:
      a first robotic device among a group of robotic devices to transmit an instruction for the delivery of the item to the delivery location;
   transmitting and receiving information between the control system and each robotic device, the information comprising an instruction, a command, an action, sensory information, environmental information, information relating to other robotic devices, a suggested instruction, a suggested command, a suggested action, mapping information, scheduling information, task information, navigation information, route information, driving information, status information, a battery level, a location, and internal and external observations;
   receiving, by the first robotic device, the instruction; and
   executing, by the first robotic device, the instruction comprising a pickup of the item from a pickup location and the delivery of the item to the delivery location;
   wherein each of the robotic devices, the control system, and an application of a communication device are configured to provide a schedule for the item delivery comprising a day, a time, and a delivery frequency.

2. The method of claim 1, wherein:
   each robotic device transmits its respective status, availability, battery level, and GPS coordinates to the control system; and
   the control system determines or modifies instructions sent to the group of robotic devices based on the statuses, availabilities, battery levels, and GPS coordinates of the robotic devices.

3. The method of claim 1, wherein each robotic device or the control system determines a respective robotic device path based on locations of previous robotic device collisions, a travel time for executing the path, locations of previous robotic device stalls, locations of obstacles, and a travel distance of the path.

4. The method of claim 1, wherein the item comprises a food.

5. The method of claim 1, wherein the delivery location comprises a location of a vehicle of a user that provided the request for delivery of the item.

6. The method of claim 1, wherein:
   the control system monitors a real-time location of a user that provided the request for delivery of the item; and
   the control system instructs a robotic device to deliver the item to the delivery location when the user is within a predetermined distance from a retail location of the item, wherein the delivery location comprises a location of the user or a predetermined location.

7. The method of claim 1, wherein each robotic device notifies the control system when the respective robotic device malfunctions, is damaged, or stalls.

8. The method of claim 1, wherein the first robotic device navigates to a storage location after completing the delivery and has no other current instruction to execute.

9. The method of claim 1, wherein the control system transmits commands to the group of robotic devices based on at least one of: observations of actions of one or more users and preferences set by the one or more users.

10. The method of claim 1, wherein the control system optimizes item pickups and deliveries based on historical data comprising at least information relating to robotic device collisions, delayed deliveries, and incomplete deliveries.

11. The method of claim 1, wherein the control system replaces the first robotic device executing the instruction with another robotic device to execute the instruction based on a location of the first robotic device and other potential replacement robotic devices, a battery level of the first robotic device and the other potential replacement robotic devices, and a time to reach the location of the first robotic device from the location of the other potential replacement robotic devices.

12. The method of claim 11, wherein the control system transmits the location of the first robotic device and a navigation route to the location of the first robotic device to the another robotic device.

13. The method of claim 11, wherein the control system transmits a closest location to recharge a battery to the first robotic device.

14. The method of claim 1, wherein at least a portion of the information received by the control system from the group of robotic devices is saved in a memory.

15. The method of claim 1, wherein the control system manages different types of robotic devices.

16. A management system for managing robotic devices, comprising:
   an application of a communication device configured to receive at least one input designating a request for delivery of an item to a delivery location;
   a control system configured to:
      receive the request for delivery of the item to the delivery location from the application of the communication device;
      configure to command a robotic device to navigate to a particular location, recharge a battery of the robotic device, travel at a specific speed, avoid a particular area, avoid particular surface types, conduct particular tasks at particular times, avoid operation at particular times, play music, transport an item, navigate to a docking station, stop a work function, conduct an internal diagnostic check, and perform a task at a particular scheduled date, time, and location; and
      determine which robotic device among the group of robotic devices to transmit the instruction to based on a status of each robotic device, an availability of each robotic device, a battery level of each robotic device, GPS coordinates of each robotic device, a carrying capacity of each robotic device, environmental factors, traffic, the delivery location, and pending requests received by the control system, wherein:
   a first robotic device among a group of robotic devices to transmit an instruction for the delivery of the item to the delivery location; and
the group of robotic devices, each configured to:
   receive the instruction; and
   execute the instruction comprising a pickup of the item from a pickup location and the delivery of the item to the delivery location;
wherein the control system optimizes item pickups and deliveries based on historical data comprising at least information relating to robotic device collisions, delayed deliveries, and incomplete deliveries.

\* \* \* \* \*